(12) United States Patent
Li et al.

(10) Patent No.: US 9,864,714 B2
(45) Date of Patent: Jan. 9, 2018

(54) ELECTRONIC SYSTEM FOR PERFORMING RECHARGING AND DATA COMMUNICATION

(71) Applicants: Chun-Hsuan Li, Taipei (TW); I-Fan Hsiao, Taipei (TW); Sung-Che Hsu, Taipei (TW)

(72) Inventors: Chun-Hsuan Li, Taipei (TW); I-Fan Hsiao, Taipei (TW); Sung-Che Hsu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 235 days.

(21) Appl. No.: 14/641,445

(22) Filed: Mar. 9, 2015

(65) Prior Publication Data

US 2015/0253828 A1 Sep. 10, 2015

Related U.S. Application Data

(60) Provisional application No. 61/950,824, filed on Mar. 10, 2014.

(51) Int. Cl.
*G06F 3/00* (2006.01)
*G06F 13/38* (2006.01)
*G06F 1/26* (2006.01)

(52) U.S. Cl.
CPC ............ *G06F 13/385* (2013.01); *G06F 1/266* (2013.01); *G06F 2213/0042* (2013.01)

(58) Field of Classification Search
None
See application file for complete search history.

(56) References Cited

U.S. PATENT DOCUMENTS

2014/0225557 A1* 8/2014 Park ...................... H02J 7/0004
320/107

FOREIGN PATENT DOCUMENTS

TW 201140322 11/2011
TW 201304307 1/2013

OTHER PUBLICATIONS

On-The-Go and Embedded Host Supplement to the USB Revision 3.0 Specification; May 10, 2012; Texas Instruments, Hewlett-Packard Company, Intel Corporation, Microsoft Corporation, Renesas Corporation, ST-Ericsson; Revision 1.1; All Pages.*

(Continued)

*Primary Examiner* — Idriss N Alrobaye
*Assistant Examiner* — Richard B Franklin
(74) *Attorney, Agent, or Firm* — JCIPRNET

(57) ABSTRACT

An electric system includes a transmission line, a first and a second electronic devices, wherein the second electronic device selectively electrically connects to an external power. The transmission line includes a first connection terminal, a second and a third connection terminal, wherein the third connection terminal selectively electrically connects to the external power. The first electronic device includes a first electrical connection portion and a detection module. The first electrical connection portion electrically connects to the first connection terminal of the transmission line. The detection module connects to the first electrical connection portion, to determine whether the second connection terminal of the transmission line is electrically connected to the second electronic device, and determine whether the third connection terminal of the transmission line is electrically connected to an the external power, and performs an operation according to a connection status of the second connection terminal and the third connection terminal.

11 Claims, 3 Drawing Sheets

(56) References Cited

OTHER PUBLICATIONS

"Office Action of Taiwan Counterpart Application", dated Feb. 17, 2016, p. 1-p. 10.

* cited by examiner

ELECTRONIC SYSTEM FOR PERFORMING RECHARGING AND DATA COMMUNICATION

CROSS-REFERENCE TO RELATED APPLICATION

This application claims the priority benefit of U.S. provisional application Ser. No. 61/950,824, filed on Mar. 10, 2014. The entirety of the above-mentioned patent application is hereby incorporated by reference herein and made a part of this specification.

BACKGROUND

Technical Field

The invention relates to an electronic system, and particularly relates to an electronic system having a transmission line detection function.

Related Art

Universal serial bus (USB) interface is adopted by many electronic devices. Besides a data transmission function, a general USB interface may further has a power transmission function. Moreover, a transmission line of the USB interface may have receptacles and plugs of a plurality of specifications, so as to match different devices and interfaces of different USB versions.

Data transmission between a plurality of electronic devices having the USB interface is implemented through transmission lines. If operations of the electronic devices are integrated and the electronic devices are required to have a charging function, data transmission between the electronic devices and charging of the electronic devices have to be considered. It is required to design a corresponding system operating method and a transmission line to satisfy the above demand.

SUMMARY

The invention is directed to an electronic system, in which electronic devices and a power supplying status are detected through a transmission line, so as to determine an operation method of the electronic devices.

The invention provides an electronic system including a transmission line, a first electronic device and a second electronic device. The second electronic device is selectively and electrically connected to a second connection terminal of the transmission line. The transmission line includes a first connection terminal, the second connection terminal and a third connection terminal. The third connection terminal is selectively and electrically connected to an external power. The first electronic device includes a first electrical connection portion and a detection module. The first electrical connection portion is electrically connected to the first connection terminal. The detection module is coupled to the first electrical connection portion, and determines whether the second connection terminal of the transmission line is electrically connected to the second electronic device, and determines whether the third connection terminal of the transmission line is electrically connected to the external power, and performs an operation according to a connection status of the second connection terminal and the third connection terminal.

In an embodiment of the invention, when the detection module determines that the first electrical connection portion of the first electronic device and the second electronic device are electrically connected through the first connection terminal and the second connection terminal of the transmission line, respectively, the first electronic device performs a data transmission operation with the second electronic device through the transmission line.

In an embodiment of the invention, the first electronic device supplies power to the second electronic device through the transmission line.

In an embodiment of the invention, when the detection module determines that the external power is connected through the third connection terminal of the transmission line, the external power is supplied to the first electronic device through the transmission line, and when the external power is sufficient, the external power is supplied to the second electronic device through the transmission line.

In an embodiment of the invention, when the detection module determines that the first electronic device is connected to the external power through the third connection terminal of the transmission line, the external power is supplied to the first electronic device through the transmission line.

In an embodiment of the invention, the first electronic device further includes a processing unit. The processing unit is coupled to the detection module, and the processing unit is coupled to a determination pin in the first connection terminal electrically connected to the first electrical connection portion. The processing unit determines whether the determination pin is electrically connected to the second electronic device according to an analog voltage of the determination pin.

In an embodiment of the invention, the determination pin is coupled to a ground terminal through a resistor.

In an embodiment of the invention, the first electrical connection portion is a universal serial bus interface.

In an embodiment of the invention, the first connection terminal of the transmission line is a plug connector of a universal serial bus 3.0 Micro-B pattern.

In an embodiment of the invention, the second connection terminal of the transmission line is a receptacle connector of a universal serial bus 3.0 Micro-AB pattern.

In an embodiment of the invention, the third connection terminal of the transmission line is a plug connection of a universal serial bus 2.0 standard pattern.

According to the above descriptions, by detecting a connection status between the connection terminals of the transmission line and different electronic devices and the external power, the method for transmitting data signal and the method for supplying power are determined according to the connection status, so as to integrate the electronic devices and implement a charging function, and the electronic devices are avoided to take an improper power supply to cause a damage.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
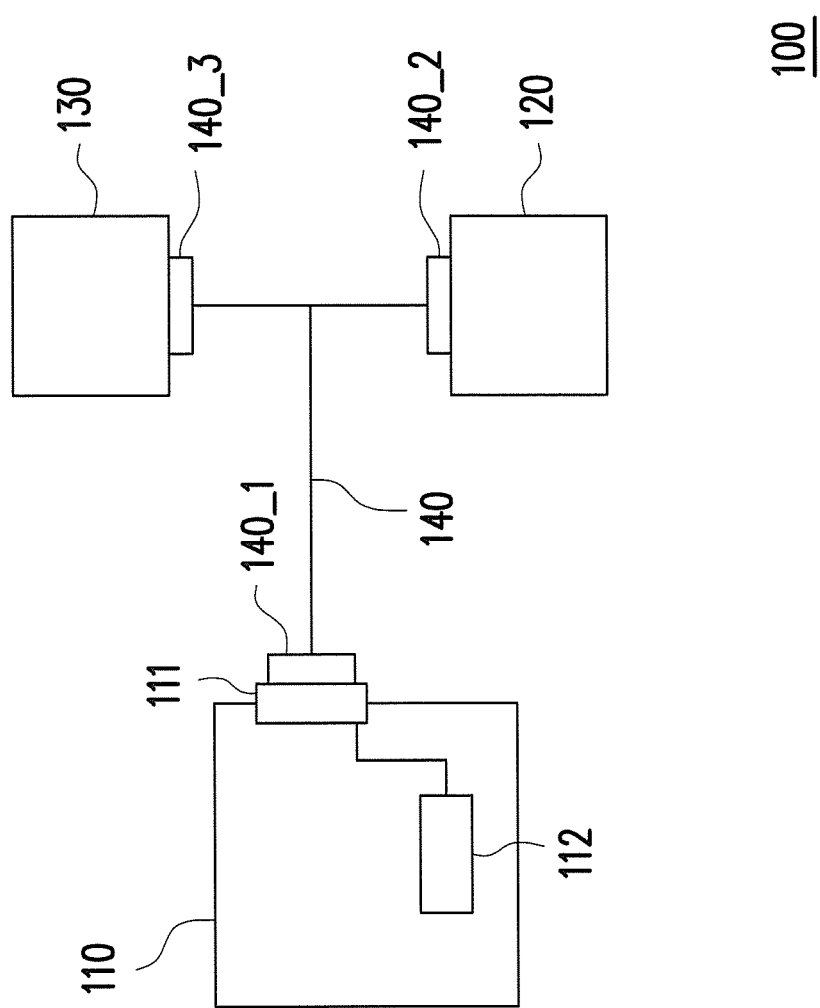
FIG. 1 is a schematic diagram of an electronic system according to an embodiment of the invention.

Referring to FIG. 1, FIG. 1 is a schematic diagram of an electronic system 100 according to an embodiment of the invention. In the present embodiment, the electronic system 100 includes a first electronic device 110, a second electronic device 120, an external power 130 and a transmission line 140. The first electronic device 110 includes a first electrical connection portion 111 and a detection module 112, and the first electrical connection portion 111 is electrically connected to the detection module 112. Moreover, the transmission line 140 includes a first connection terminal 140_1, a second connection terminal 140_2 and a third connection terminal 140_3 for connecting the first electronic device 110, the second electronic device 120 and the external power 130. The first electronic device 110 of the present embodiment can be a device having a micro-controller unit (MCU) or a central processing unit (CPU), such as a mobile phone or a tablet personal computer (PC), etc., and the second electronic device 120 can be an input device such as a keyboard or a mouse, or can be a storage device such as a portable external hard drive, etc. The external power 130 can be a general city power, a mobile power, or a power supply, etc., which is not limited by the invention.

In the present embodiment, the first electrical connection portion 111 of the first electronic device 110 is electrically connected to the first connection terminal 140_1 of the transmission line 140. In this way, the detection module 112 can determine whether the second connection terminal 140_2 of the transmission line 140 is electrically connected to the second electronic device 120, and determines whether the third connection terminal 140_3 of the transmission line 140 is electrically connected to the external power 130.

When the detection module 112 determines that the first electrical connection portion 111 of the first electronic device 110 and the second electronic device 120 are electrically connected to the first connection terminal 140_1 and the second connection terminal 140_2 of the transmission line 140, respectively, a data signal is transmitted between the first the first electronic device 110 and the second electronic device 120 through the transmission line 140, where the data signal can be an input data signal of an input device or a read/write data signal of a storage device, which is not limited by the invention. It is assumed that the first electronic device 110 is a tablet PC, and the second electronic device 120 is a keyboard, the data signal input by a user by using the keyboard is transmitted to the tablet PC through the transmission line 140. The tablet PC correspondingly displays a character input by the user by using the keyboard after receiving the data signal.

Moreover, the third connection terminal 140_3 of the present embodiment can be selectively and electrically connected to the external power 130. When the first electronic device 110 and the second electronic device 120 are electrically connected through the transmission line 140, since the third connection terminal 140_3 is not connected to the external power, the first electronic device 110 supplies an operating power required by the second electronic device 120. It should be noticed that the transmission line 140 of the present embodiment does not support the second electronic device 120 to provide power to the first electronic device 110, and a reason thereof is that if the second electronic device 120 does not have sufficient power for supplying to the first electronic device 110, the power of the first electronic device 110 probably flows to the second electronic device 120 to result in a fact that the first electronic device 110 cannot successfully operate.

In a different embodiment, when the detection module 112 determines that the first electrical connection portion 111 of the first electronic device 110 and the external power 130 are electrically connected to the first connection terminal 140_1 and the third connection terminal 140_3 of the transmission line 140, respectively, the external power 130 charges the first electronic device 110 through the transmission line 140.

In another embodiment, when the detection module 112 determines that the first electronic device 110 is electrically connected to the second electronic device 120, and further determines that the third connection terminal 140_3 is electrically connected to the external power 130, besides that the external power 130 can charge the first electronic device 110 through the transmission line 140, the external power 130 can further charge the second electronic device 120. It should be noticed that before the external power 130 fully charges the first electronic device 110, the detection module 112 controls to charge the first electronic device 110 in priority, and the remaining power is charged to the second electronic device 120, or when the first electronic device 110 has sufficient power, the remaining power serves as the operating power of the second electronic device 120.

To be specific, in the electronic system of the invention, the detection module determines a connection status among the transmission line and the first electronic device, the second electronic device and the external power to perform an operation, so as to ensure a successful power transmission and data signal transmission between the first electronic device and the second electronic device, and make the external power to supply power to the first electronic device and the second electronic device.

Figure 2:
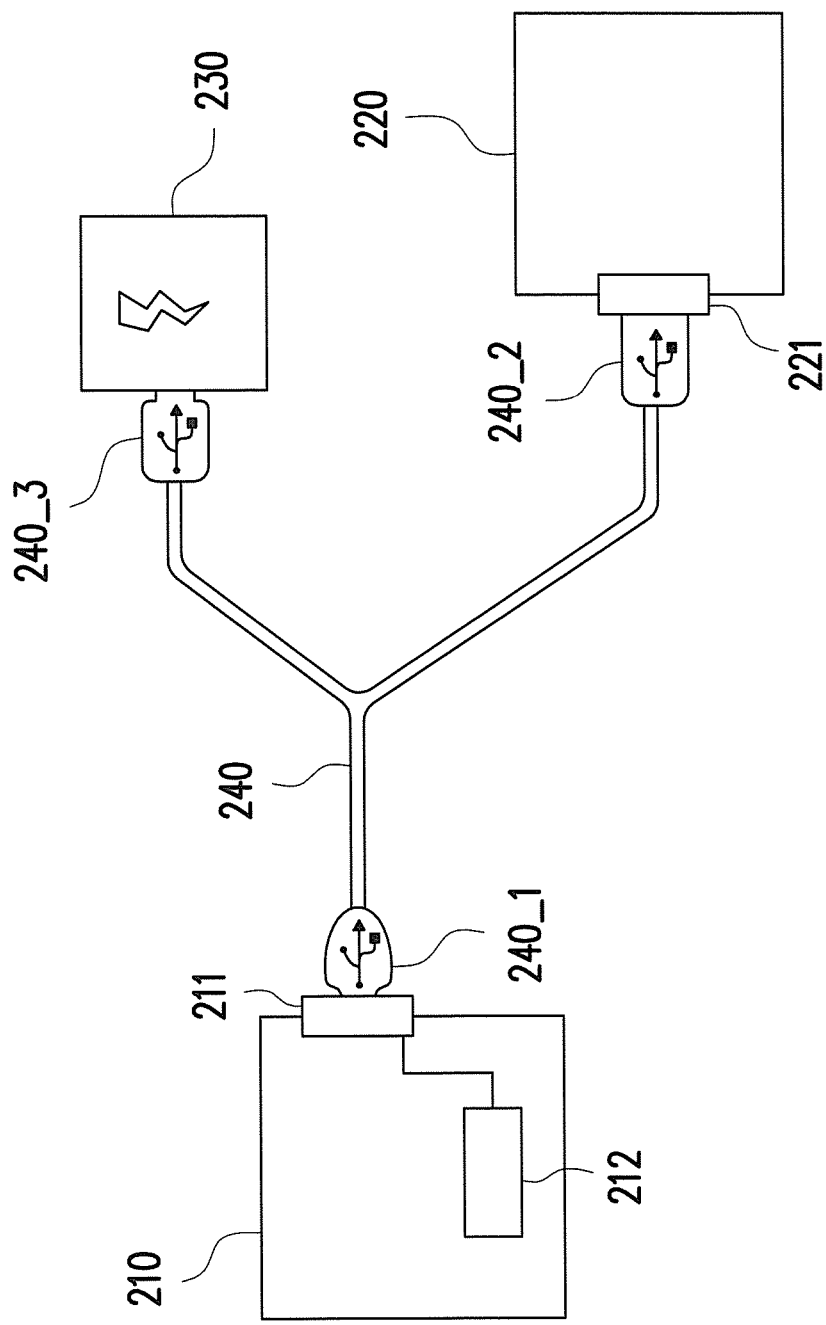
FIG. 2 is a schematic diagram of an electronic system according to an embodiment of the invention.

Referring to FIG. 2, FIG. 2 is a schematic diagram of an electronic system 200 according to an embodiment of the invention. The electronic system 200 includes a first electronic device 210, a second electronic device 220, an external power 230, a transmission line 240 and a second transmission line 250. In the present embodiment, the transmission line 240 can be a two-male one-female transmission line, where a first connection terminal 240_1 and a third connection terminal 240_3 are male connectors, and a second connection terminal 240_2 is a female connector. Moreover, a first electrical connection portion 211, a second electrical connection portion 221, the transmission line 240 are all universal serial bus (USB) interfaces. The second electrical connection portion 221 can be a USB interface complied with the second connection terminal 240_2. For example, the first electrical connection portion of the first electronic device 210 can be a receptacle connector of a USB 3.0 Micro-AB pattern, the corresponding first connection terminal 240_1 of the transmission line 240 can be a plug connector of a USB 3.0 Micro-A pattern or USB 3.0 Micro-B pattern, the second connection terminal 240_2 can be a USB 3.0 standard receptacle, and the third connection terminal 240_3 can be a plug connector of a USB 2.0 standard pattern.

A detailed operation method of the present embodiment may refer to the embodiment of FIG. 1, which is not repeated. It should be noticed that a fourth pin (pin 4) of a general USB 3.0 Micro-B connector is a USB On-The-Go (OTG) ID pin, and a first pin (pin 1) is a power ($V_{BUS}$) pin. In different transmission lines, a function of the fourth pin is to determine a main device and a peripheral device connected to the two ends of the transmission line when the two ends of the transmission line are connected to different devices, so as to provide a power transmission specification complied with a USB power delivery (USB PD) port. Therefore, data can be transmitted between the first transmission line 240 of the present embodiment and an external device complied with a USB interface (for example, USB 1.0, 2.0, 3.0), a USB battery charging (USB BC) interface (for example, USB BC 1.2) and/or a USB PD interface through the corresponding USB connection port. Referring to a following table 1, power management of the transmission line 240 is listed in the table 1, where the transmission line 240 can detect whether any device connected to the first electrical connection portion 211 is one of a standard downstream port (SDP), a charging downstream port (CDP) and a dedicated charging port (DCP), so as to manage the power transmitted/supplied by the transmission line 240 according to the general USB standard or the USB BC standard.

TABLE 1

| Device type | USB pin 4 | USB pin 1 | Transmitted/supplied power |
|---|---|---|---|
| USB device | Low level | (undefined) | 0.5 A output |
| Electronic device such as PC, tablet PC, etc. | High level | Low level | 0.5 A input (SDP) |
| AC adapter | High level | High level | 1.8 A input (DCP) |

In the transmission line 240 of the present embodiment, the second connection terminal 240_2 is a USB 3.0 Micro-B connector, so that the fourth pin is also the USB OTG ID pin. Moreover, in the present embodiment, the fourth pin is designed to connect a first end of a resistor, and a second end of the resistor is coupled to a ground terminal, such that when the first electronic device 210 and the second electronic device 220 are connected, and in case that the power of the second electronic device 200 is not sufficient for providing to the first electronic device 210, the power of the first electronic device 210 does not flow into the second electronic device 220 to result in a fact that the first electronic device 210 cannot successfully operate. In other words, the fourth pin of the present embodiment has a function of a determination pin. Moreover, the resistor connected to the fourth pin can be 20 KΩ or 100 KΩ, etc., which is not limited by the invention.

Figure 3:
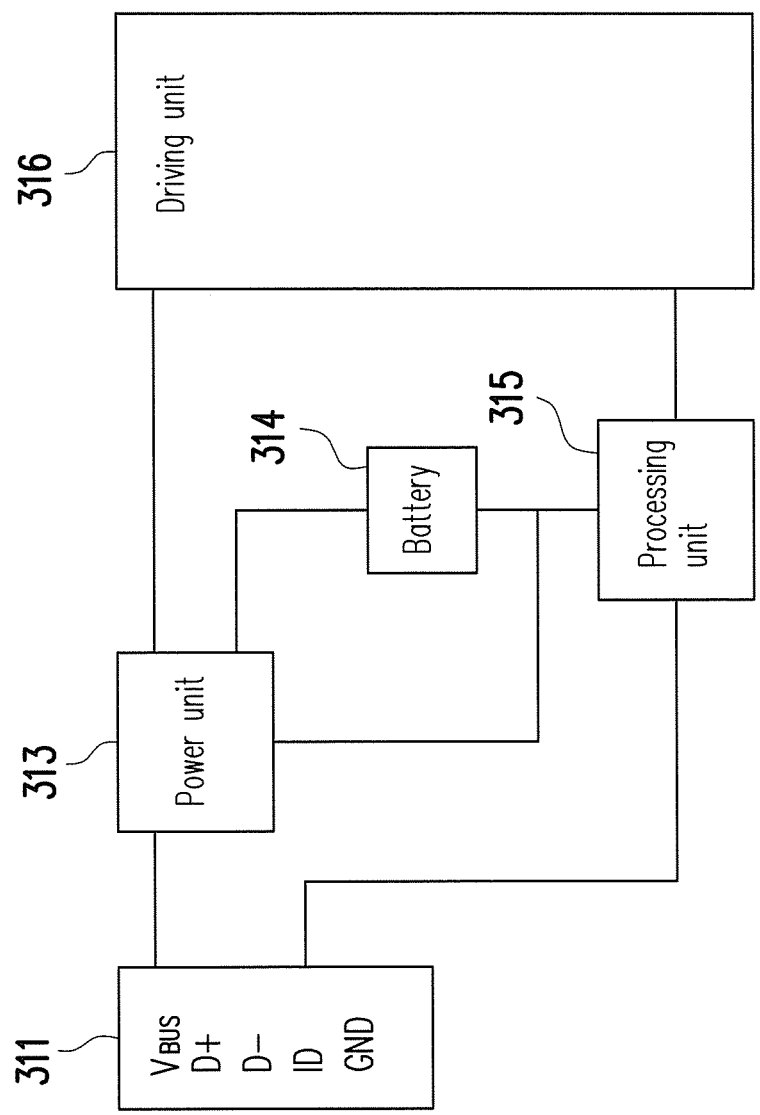
FIG. 3 is a block schematic diagram of a first electronic device according to an embodiment of the invention.

Referring to FIG. 3, FIG. 3 is a block schematic diagram of a first electronic device 310 according to an embodiment of the invention. The first electronic device 310 includes a first electrical connection portion 311, a power unit 313, a battery 314, a processing unit 315 and a driving unit 316. In the first electrical connection portion 311 of the present embodiment, the fourth pin (ID pin) is coupled to the processing unit 315, the first pin ($V_{BUS}$ pin) is coupled to the power unit 313. According to the description of the aforementioned embodiment, it is known that the power management method of the transmission line 240 is to determine the device connected to the fourth pin, and then the first pin selects to charge the battery 314 or perform data transmission with the processing unit 315 according to a determination result.

It should be noticed that in the first electronic device 310 of the present embodiment, the serial communication bus applied by the processing unit 315, the power unit 313, the battery 314 and the driving unit 316 is an inter integrated circuit ($I^2C$). Moreover, the processing unit 315 is an analog signal processing device, so that the processing unit 315 can determine an analog voltage of the fourth pin, so as to detect a connection status between the fourth pin and the second electronic device.

In summary, by detecting a connection status between the connection terminals of the transmission line and different electronic devices and the external power, the method for transmitting data signal and the method for supplying power are determined according to the connection status, so as to integrate the electronic devices and implement a charging function, and the electronic devices are avoided to take an improper power supply to cause a damage.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic system, comprising:
   a transmission line, having a first connection terminal, a second connection terminal and a third connection terminal, wherein the third connection terminal is selectively and electrically connected to an external power;
   a first electronic device; and
   a second electronic device, selectively and electrically connected to the second connection terminal of the transmission line,
   wherein the first electronic device comprises:
      a first electrical connection portion, electrically connected to the first connection terminal of the transmission line;
      a detection module, coupled to the first electrical connection portion;
      a processing unit, coupled to the detection module, and coupled to a determination pin and a first pin in the first connection terminal electrically connected to the first electrical connection portion, wherein the processing unit identifies voltage levels of the determination pin and the first pin,
   wherein when the identified voltage level of the determination pin is a first value, the detection module determines that the second connection terminal of the transmission line is electrically connected to the second electronic device, the first electronic device supplies a power of a first current to the second electronic device,
   wherein when the identified voltage level of the determination pin is a second value and the identified voltage level of the first pin is a third value, the detection module determines that the third connection terminal of the transmission line is electrically connected to a first type external power, and the first electronic device receives the first current of power supplied from the first type external power, wherein the second value is higher than the first value and the third value,
   wherein when the identified voltage level of the determination pin is a second value and the identified voltage level of the first pin is a fourth value, the detection module determines that the third connection terminal of the transmission line is electrically connected to a second type external power, and the first electronic device receives a second current of power supplied from the second type external power, wherein the fourth value is higher than the third value, and the second current is higher than the first current, so as to perform a corresponding power management according to different connection statuses which is determined by identifying the voltage levels of the determination pin and the first pin.

2. The electronic system as claimed in claim 1, wherein when the detection module determines that the first electronic device and the second electronic device are electrically connected through the first connection terminal and the second connection terminal of the transmission line, respectively, the first electronic device performs a data transmission operation with the second electronic device through the transmission line.

3. The electronic system as claimed in claim 2, wherein the first electronic device supplies power to the second electronic device through the transmission line.

4. The electronic system as claimed in claim 2, wherein when the detection module determines that the external power is connected through the third connection terminal of the transmission line, the external power is supplied to the first electronic device through the transmission line, and when the external power is sufficient, the external power is supplied to the second electronic device through the transmission line.

5. The electronic system as claimed in claim 1, wherein when the detection module determines that the first electronic device is connected to the external power through the third connection terminal of the transmission line, the external power is supplied to the first electronic device through the transmission line.

6. The electronic system as claimed in claim 1, wherein the first electronic device further comprises:
   a processing unit, coupled to the detection module, and coupled to a determination pin in the first connection terminal electrically connected to the first electrical connection portion,
   wherein the processing unit determines whether the determination pin is electrically connected to the second electronic device according to an analog voltage of the determination pin.

7. The electronic system as claimed in claim 6, wherein the determination pin in the first connection terminal of the transmission line is coupled to a first end of a resistor, and a second end of the resistor is coupled to a ground terminal.

8. The electronic system as claimed in claim 1, wherein the first electrical connection portion is a universal serial bus interface.

9. The electronic system as claimed in claim 1, wherein the first connection terminal of the transmission line is a plug connector of a universal serial bus 3.0 Micro-A pattern or a universal serial bus 3.0 Micro-B pattern.

10. The electronic system as claimed in claim 1, wherein the second connection terminal of the transmission line is a receptacle connector of a universal serial bus 3.0 standard pattern.

11. The electronic system as claimed in claim 1, wherein the third connection terminal of the transmission line is a plug connector of a universal serial bus 2.0 standard pattern.

* * * * *